April 11, 1961 E. T. SLAYTON 2,978,792
ROUGHING CUTTER FOR SPIRAL BEVEL AND HYPOID GEARS
Filed July 16, 1958
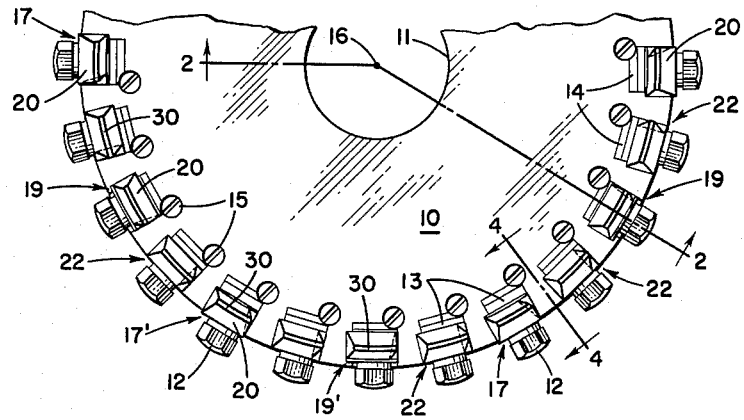
FIG. 1
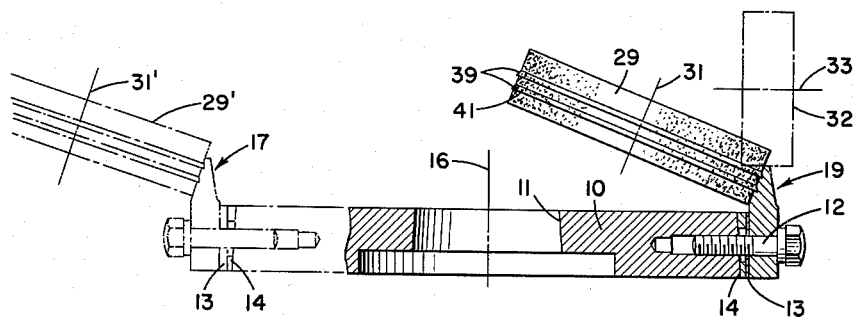
FIG. 2
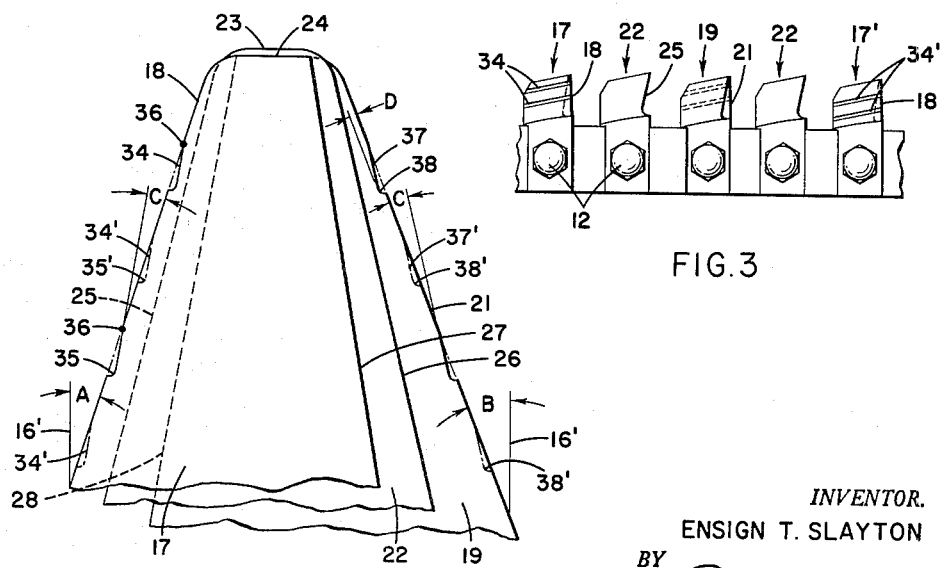
FIG. 3
FIG. 4
INVENTOR.
ENSIGN T. SLAYTON
BY
Richard W. Treverton
ATTORNEY · # United States Patent Office 2,978,792
Patented Apr. 11, 1961

2,978,792
ROUGHING CUTTER FOR SPIRAL BEVEL AND HYPOID GEARS

Ensign T. Slayton, Rochester, N.Y., assignor to The Gleason Works, Rochester, N.Y., a corporation of New York Filed July 16, 1958, Ser. No. 748,944
4 Claims. (Cl. 29—105)

The present invention relates to face mill cutters for gears and other toothed parts, especially but not exclusively for non-generated or form cut spiral bevel and hypoid gears of heavy pitch.

Conventional cutters for such gears are fed depthwise into the work and their side cutting edges cut chips whose width corresponds to the tooth depth. When rapid feed rates are employed, as is necessary for efficient production, the great chip width places heavy cutting loads on the machines, and leads to chatter, vibration and poor surface finish of the gear teeth. It has been found that by breaking up the chips, by means of a cutter having interrupted or grooved side cutting edges, an easier cutting action is obtained, resulting in smaller cutting loads on the machine and better surface finish of the teeth.

The primary object of the invention is a cutter having blades with such chip-breaking grooves and which can be produced, at little or no increase in cost over conventional cutters, by the conventional relieving method. By this method not only are the blade surfaces back of the cutting edges given clearance from the cut tooth surfaces but they are so shaped that as the front faces of the blades are sharpened back the cutting edges are maintained in the same relationship to the cutter axis.

A face mill cutter according to the invention comprises a plurality of blades each of which has its cutting side face and its tip face relieved in the direction of the cutter axis, the axial lead of the relief being the same for both of said faces whereby the angular relationship of the side and tip cutting edges to each other and to the cutter axis is maintained as the front faces of the blades are sharpended back, each cutting side face having at least one groove extending from end to end thereof, said groove being of substantially constant cross-section from end to end and the surfaces thereof being relieved in the direction of the cutter axis and being of substantially the same axial lead as the relief of said side and tip faces, every surface portion of the groove, as considered in a plane passing therethrough which contains the cutter axis, being inclined to said axis in the same sense, although not necessarily to the same degree, that the related cutting side face is inclined to said axis in said plane. Both the side cutting faces and the side faces of the grooves preferably are straight, or nearly straight, as considered in planes containing the cutter axis.

A preferred example is shown in the accompanying drawings wherein:

Fig. 1 is a fragmentary face view of the cutter;

Fig. 2 is an axial section in the planes designated 2—2 in Fig. 1, the view showing the relationship to the cutter of the abrasive wheels employed in relief grinding the cutting side faces and tip faces of the blades;

Fig. 3 is a fragmentary developed side view of the cutter, showing several successive blades thereof; and, Fig. 4 is a diagram on an enlarged scale showing the relationship of various blades of the cutter when rotated into the same plane containing the cutter axis, such plane being as indicated by section line 4—4 of Fig. 1.

The cutter comprises a circular head or body 10 having a central bore 11 for mounting on the cutter spindle of a gear cutting machine and having spaced about its periphery a plurality of slots receiving the shanks of inserted blades. The blades are secured to the head by radially disposed screws 12. Shims 13, and wedges 14 that are adjustable by means of screws 15, are provided in the slots beneath the blade shanks to enable positioning the blades at the exact desired radial distance from the cutter axis 16.

The particular cutter shown has three basically different kinds of blades: outside blades 17 and 17' whose side cutting edges 18 are for cutting the longitudinally concave sides of the gear teeth, inside blades 19 and 19' whose side cutting edges 21 are adapted to cut the convex sides of the teeth, and bottom-cutting blades 22 which cut primarily along their tip edges 23. In Fig. 4 the blades 17, 22 and 19 rotated into the same axial plane are shown in full and dotted lines and the side edges of the blades 17' and 19' are shown, also rotated into the same axial plane, in dash-dot lines. As shown the bottom cutting blades 22 project beyond the side cutting blades, in a direction axial of the cutter, by a distance such that tip edges 24 of the latter do not cut even as the cutter is being fed axially into the work. Similarly the straight side edges 25 and 26 of the bottom cutting blades are respectively inset and outset, radially of the cutter, from the outside cutting edges 18 and the inside cutting edges 21, and hence they are non-cutting. The front inside edges 27 of blades 17 and 17', and the front outside edges 28 of blades 19 and 19' are respectively outset and inset radially even further than edges 26 and 25, and therefore are also non-cutting. As best shown in Figs. 1 and 3 a bottom-cutting blade 22 immediately precedes each side cutting blade; and outside and inside blades alternate around the cutter head.

In order that the blade surfaces back of the cutting edges will have clearance from the tooth surfaces being cut, and that the relationship of the tip and side cutting edges to the cutter axis will be maintained as the front face of the blades are sharpened back, the cutting side faces 20 back of edges 18 and 21, the corresponding cutting side faces back of edges 25 and 26, and the tip faces 30 back of edges 23 and 24, are relieved in the direction of the cutter axis and the axial lead of the relief is made the same for all of the cutting side faces and for the tip faces. The relief is such that all of these faces are, either exactly or approximately, helicoidal surfaces coaxial of the cutter and of the same axial lead. For example the inside cutting side faces of blades 19, back of edges 21, may be formed by mounting the inside blades in a head, similar or identical to head 10, and grinding them with the cylindrical surface of an abrasive wheel 29 positioned as shown in Fig. 2 with its axis 31 in a plane containing axis 16. The wheel while grinding is advanced toward the cutter head in the direction of cutter axis 16 in a predetermined constant velocity ratio to rotation of the head. The tip faces back of the edges 23 and 24 may be produced with a similar cylindrical wheel 32 whose axis is 33. The cutting side faces of blades 17, back of edges 18, may be produced with the cylindrical surface of wheel 29 positioned as shown at 29', with its axis at 31'. The side faces of blades 22 back of edges 25 and 26 may be ground with a cylindrical wheel positioned similarly to that shown at 29' and 29, respectively. The wheel axis in every one of these instances lies in a plane containing the cutter axis 16 and as grinding takes place the wheel is advanced along the latter axis in the same ratio to rotation of the cutter head that is employed in grinding the cutting side faces of blades 19.

According to the present invention the cutting side faces 20 of blades 17, 17' and 19, 19' are provided with chip-breaking grooves which are of substantially constant cross-section from end to end of the blades. These grooves are shown in Figs. 2, 3 and 4 but are omitted from Fig. 1. The groove surfaces are relieved in the direction of the cutter axis and are of the same axial lead as the relief of the cutting side faces and the tip faces 24 of the blades. The blades 17 have two parallel grooves with side faces 34 which are substantially straight in profile, as shown in Fig. 4, and curved profile bottom faces 35. The side faces 34 are inclined to the cutter axis at a smaller angle than the related cutting side faces and they intersect the cutting side faces in lines which represent the top edges of the grooves. These appear in Fig. 4 as juncture points 36. All points along each such juncture line lie at the same radial distance from the cutter axis 16, just as do all points along the helical juncture lines of surfaces 20 and 30 (assuming that these surfaces are extended so as to intersect in a single line, which is usually not the case). The grooves of blades 17' similarly have side faces 34' and bottom faces 35', but they are offset from the grooves 34, 35, i.e. spaced at different distances from the tip faces of the cutter than are the grooves 34, 35, so that the cutter as a whole presents an outside cutting profile that is continuous and uninterrupted by the grooves. The cutting side faces 20 of blades 19, 19' have similarly shaped and positioned grooves with side faces 37, 37' and bottom faces 38, 38'.

In all cases the side faces of the grooves are of positive pressure angle smaller than the pressure angle of the related cutting side face proper. That is, the outside and inside cutting side faces are inclined to the cutter axis, which is parallel to line 16' of Fig. 4, by pressure angles A and B respectively, while the groove side faces 34 and 37 are inclined to the related side faces by the smaller angle C. In the example shown the angles A, B and C are respectively eighteen, twenty-two and eight degrees, so that the actual pressure angles of sides 34 and 37 are ten and fourteen degrees respectively. Since these sides 34, 37 are of positive angle, i.e. are inclined in the same sense or hand as the related cutting side faces, they can be ground in the same relief grinding operation as these side faces by merely dressing annular ridges 39 of triangular cross-section on the cylindrical surface of wheel 29. The sides of these ridges are of course inclined to the axis 31 by the angle C, while the bottom faces 41 thereof are plane, perpendicular to axis 31. However, due to the helical relieving motion the juncture edges of the side and bottom surfaces of the ridges produce the curved bottom surfaces 35, 35' and 38, 38' of the grooves.

The depth D of the grooves is greater than the maximum chip thickness to be taken by the cutter. In the particular cutter chosen as an example, for which the intended maximum chip thickness is about 0.006 inch, the height of the grooves, i.e. their vertical dimension in Fig. 4, is seven sixty-fourths of an inch, and their depth D about 0.02 inch. The spacing of the grooves from the tip surfaces of the blades depends upon the tooth depth of the gear to be cut.

Having now described a typical cutter which constitutes a preferred embodiment of the novel principles involved, what I claim as my invention is:

1. A face mill cutter, for gears and other toothed parts, comprising a plurality of blades each of which has its cutting side face and its tip face relieved in the direction of the cutter axis, the axial lead of the relief being the same for both of said faces whereby the angular relationship of the side and tip cutting edges to each other and to the cutter axis is maintained as the front faces of the blades are sharpened back, each cutting side face having at least one groove extending from end to end thereof, said groove being of substantially constant cross-section from end to end and the surfaces thereof being relieved in the direction of the cutter axis and being of substantially the same axial lead as the relief of said side and tip faces, every surface portion of the groove, as considered in a plane passing therethrough which contains the cutter axis, being inclined to said axis in the same sense, although not necessarily to the same degree, that the related cutting side face is inclined to said axis in said plane.

2. A cutter according to claim 1 in which each of said grooves has a side face which at the edge thereof nearest the tip face of the blade intersects the related cutting side face and, as considered in a plane containing the cutter axis, is inclined to said axis at a smaller angle than said related cutting side face.

3. A cutter according to claim 1 in which the cutting side face, the tip face and the surfaces of the groove are coaxial helical surfaces whose helix axis is substantially coincident with the cutter axis.

4. A cutter according to claim 2 in which said cutting side faces and said side faces of said grooves are substantially straight as considered in planes containing the cutter axis.

References Cited in the file of this patent

UNITED STATES PATENTS

| | | |
|---|---|---|
| 1,492,505 | Bonnaffous | Apr. 29, 1924 |
| 2,036,656 | Stowell | Apr. 7, 1936 |
| 2,125,943 | McMullen | Aug. 9, 1938 |
| 2,218,786 | Candee | Oct. 22, 1940 |
| 2,268,326 | Stewart | Dec. 30, 1941 |
| 2,278,738 | Praeg | Apr. 7, 1942 |
| 2,524,301 | Bauer | Oct. 3, 1950 |
| 2,869,218 | Linder | Jan. 20, 1959 |
| 2,881,508 | Linder | Apr. 14, 1959 |

FOREIGN PATENTS

| | | |
|---|---|---|
| 608,897 | France | Apr. 30, 1926 |